Jan. 4, 1966
T. P. BRODICK
3,226,978
AIR ACTUATED GROUND SPEED INDICATOR
Filed Nov. 5, 1964
2 Sheets-Sheet 1
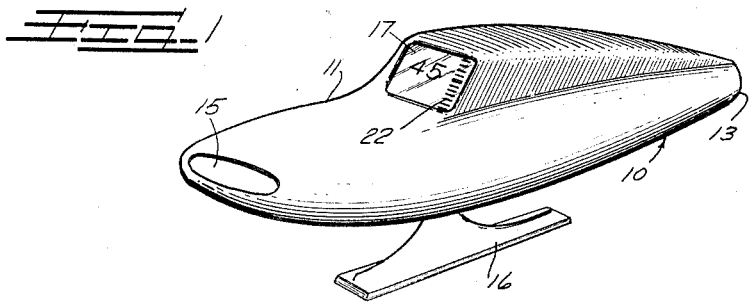
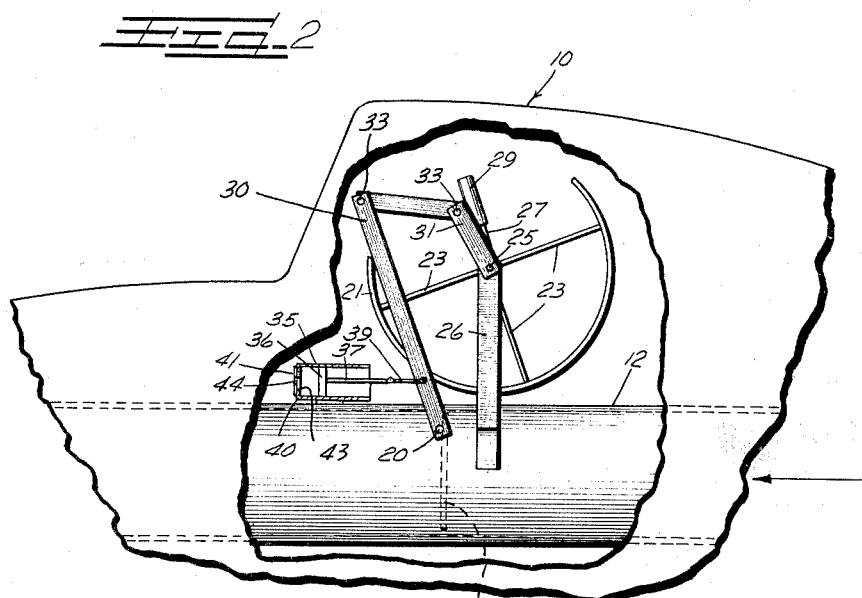
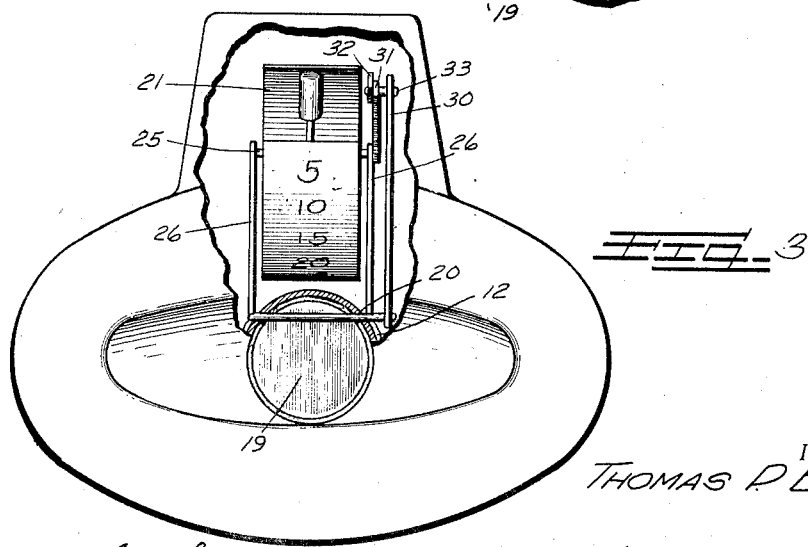
INVENTOR.
THOMAS P. BRODICK
BY *Hill, Sherman, Meroni, Gross & Simpson*
ATTORNEYS Jan. 4, 1966 T. P. BRODICK 3,226,978
AIR ACTUATED GROUND SPEED INDICATOR
Filed Nov. 5, 1964 2 Sheets-Sheet 2
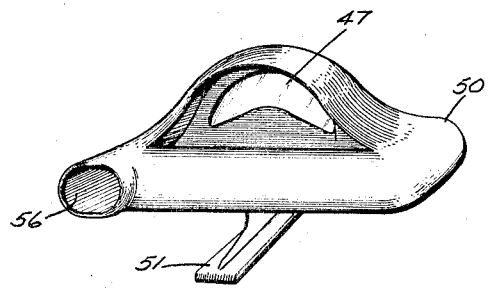
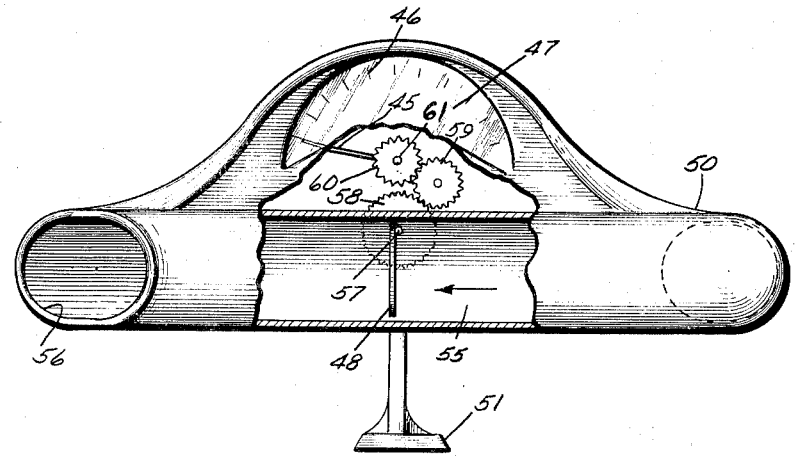
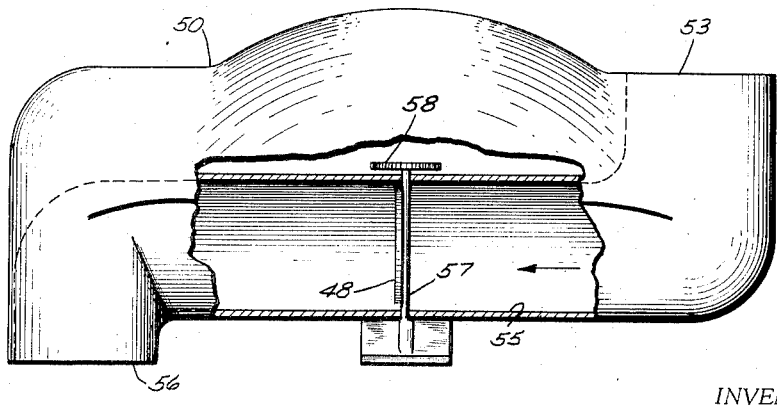
INVENTOR.
THOMAS P. BRODICK United States Patent Office 3,226,978
Patented Jan. 4, 1966

3,226,978
AIR ACTUATED GROUND SPEED INDICATOR
Thomas Paul Brodick, 627 Fairfield Ave., Lombard, Ill.
Filed Nov. 5, 1964, Ser. No. 409,200
4 Claims. (Cl. 73—186)

This invention relates to improvements in ground speed indicators of the air actuated type particularly adapted for automotive and other vehicles.

A principal object of the present invention is to provide an improved form of ground speed indicator for vehicles, visible to the operator of the vehicle without taking the eye from the path of travel of the vehicle.

Another object of the invention is to provide an improved form of air actuated ground speed indicator for indicating the ground speed of vehicles such as, automotive vehicles, boats, airplanes and the like, which may be placed in the line of travel of the vehicle, so the speed of the vehicle may readily be observed without taking the eye from the line of travel of the vehicle.

A further object of the invention is to provide an air actuated ground speed indicator for vehicles in the form of a casing having an air passageway leading therethrough and extending in the direction of travel of the vehicle, with a valve or diaphragm in the air passageway and actuating a speed indicator in the line of travel of the vehicle.

A still further object of the invention is to provide a ground speed indicator particularly adapted for automotive vehicles which may be placed on the hood of the vehicle and has a window visible to the operator of the vehicle along which a speed indicator is moved by the velocity of air flowing through the indicator casing.

Still another object of the invention is to provide an improved form of speedometer operated by the flow of air through a passageway, and arranged with a view toward utmost visibility to the operator of the vehicle and simplicity in construction and operation.

These and other objects of the invention will appear from time to time as the following specification proceeds and with reference to the accompanying drawings wherein:

FIGURE 1 is a perspective view of an air actuated ground speed indicator constructed in accordance with the principles of the present invention, looking toward the end of the speed indicator facing the operator of the vehicle;

FIGURE 2 is an enlarged fragmentary view in side elevation of the speed indicator shown in FIGURE 1 with certain parts broken away in order to show certain details of construction of the speed indicator;

FIGURE 3 is an end view of the speed indicator shown in FIGURE 1, looking at the speed indicator in the same direction as in FIGURE 1, with certain parts broken away and certain other parts shown in transverse section;

FIGURE 4 is a perspective view of a modified form in which the invention may be embodied;

FIGURE 5 is an enlarged end view of the speed indicator shown in FIGURE 4, looking at the indicator in the direction viewed by the operator of the vehicle, with certain parts broken away and certain other parts shown in vertical section; and FIGURE 6 is a top plan view of the speed indicator shown in FIGURE 5 with certain parts broken away and certain other parts shown in horizontal section.

In the embodiment of the invention illustrated in the drawings, I have shown in FIGURE 1 a ground speed indicator 10 particularly adapted for automotive vehicles, but which may also be used on boats and aircraft or on various other forms of vehicles.

The indicator 10 includes generally a housing 11 having an air tube 12 leading therethrough, opening to the atmosphere at an advance or forward end 13 of the indicator and having an outlet 15 at the rear end of the indicator. The tube 12 may be round or of various other forms and may have an enlarged outlet 15 to facilitate the flow of air therethrough. The casing 11 also has a stand or pedestal 16 extending downwardly therefrom. The pedestal 16 may be made from a magnetic material such as "Alnico" to readily be mounted on the hood or a fender of the vehicle, to position a window 17 in the clear view of the operator of the vehicle. The pedestal 16, however, need not be magnetic but may be clamped or otherwise secured to the hood or a fender of the vehicle, if desired.

As shown in FIGURES 2 and 3 the air tube 12 has a diaphragm or vane 19 pivotally mounted therein on a transverse pivot pin 20 extending through the tube 12 upwardly of the center thereof, and pivotally mounted in said tube. The vane 19 may be welded or otherwise secured to the pin 20 to pivotally move said pin with pivotal movement to said vane by the flow of air passing through said tube.

Above the tube 12 is a speed indicator dial 21 shown as being in the form of a segment of a drum and having indicia on the outer periphery thereof indicating the speed of the vehicle in accordance with the position of said drum as moved by the vane 19. The window 17 may be a glass or plastic window and has graduated indicia 22 thereon, cooperating with the speed indicating indicia on the periphery of the drum segment 21, to enable the miles per hour travelled to be readily observed.

While I have herein shown the indicia 22 to one side of the window 17, it should be understood that the indicia may be on the drum and that a single indicator mark may be marked on the window, to indicate the exact miles per hour travelled by the vehicle.

The drum segment 21 is shown as having three spokes 23 secured to the inside thereof and extending radially inwardly therefrom and welded or otherwise secured to a transverse pivot shaft 25, coaxial with the axis about which the drum segment is struck. The shaft 25 is pivotally mounted at its opposite ends in bracket legs 26, 26 welded or otherwise secured to opposite sides of the tube 12 and extending upwardly therefrom in parallel relation with respect to each other. A fourth spoke 27 extends from the pivot shaft 25 and in effect forms a continuation of the intermediate spoke 23 and has a weight 29 on the outer end thereof, serving as a counterweight to bring the drum segment 21 to its low speed position and to counterbalance the off-center weight of the drum segment and aid in travel of the drum segment to its high speed indicating positions.

A crank and link connection is provided between the vane 19 and drum segment 17 to rotate the drum segment in accordance with pivotal movement of the vane 19, and the travel of air through the tube 12. This connection is shown as including a drive arm 30 secured to the vane shaft 20 and extending upwardly therefrom. A crank arm 31 is shown as being secured to the outer end of the drum segment shaft 25, and as extending upwardly therefrom. A link 32 connects the upper end of the drive arm 30 with the upper end of the crank arm 31 on pivot pins 33, 33.

The flow of air through the tube 12 is directly proportional to the speed of the vehicle and will pivot the vane 19 and drive arm 30 in a clockwise direction and move the drum segment 21 through the link 32 and crank 31 in a similar direction. This will bring the speed indicating indicia upwardly in front of the window 17 and accurately indicate the speed of travel of the vehicle.

While no bearings are shown herein, it should be understood that the shaft 25, the pivot pin 20 and pins 33, 33 may be mounted in suitable bearings, in order to avoid any drag in movement of the drum segment in accordance with the velocity of air flowing through the tube 12, to give an accurate indication of the ground speed of the vehicle.

In FIGURE 2 I have shown a damping means for damping travel of the drum segment 21, particularly at low air speeds, to assure uniform travel of said drum in a speed increasing direction, but to allow the drum 22 to rotate freely in a speed decreasing direction. The damping means is diagrammatically shown as comprising a dash pot in the form of a cylinder 35 mounted on the top of the air flow tube 12, in a suitable manner, and having a piston 36 therein having a piston rod 37 extending from the cylinder toward the drive arm 30. A line 39 pivotally connects the piston rod 37 with the drive arm 30. The cylinder 35 has a head 40 having a check valve 41 transversely pivoted to the outer end thereof and closing a relatively large open area 43 in said head. The check valve 41 has an orifice 44 leading therethrough, bleeding a predetermined quantity of air into the cylinder in the space between the head thereof and the piston 36 in accordance with the damping effect required by the dash pot, to effect uniform rotation of the drum segment 21 in a speed increasing direction. As the speed of the vehicle increases (and the piston 36 is moved away from the head end 40 of the cylinder) the check valve 41 closes, permitting the bleeder hole therein to control movement of the piston away from the head end.

As the speed of the vehicle decreases and the drum segment is moving in a speed decreasing direction, the check valve 41 will open to accommodate free travel of the piston 36 toward the head of the dash pot cylinder.

It should here be understood that while I have shown a dash pot damping travel of the drum segment 21 in a speed indicating direction, that the dash pot need not necessarily be used, but provides a smoother rotational travel of the drum segment in a speed increasing direction and particularly at low speeds, and damps the tendency of the drum to flutter where the vehicle may be travelling at a constant speed.

In the embodiment of the invention illustrated in FIGURES 4, 5 and 6 of the drawings, the ground speed indicator operates on the same principles as that illustrated in FIGURES 1, 2 and 3. In this form of the invention, a needle 45 is moved along calibrations 46 on a window 47 by an air actuated vane 48. The speed indicator includes a casing 50 mounted on a pedestal or stand 51, which may have a magnetic base and may be mounted on the hood of an automotive vehicle, or on the exterior of a boat or plane in position to be readily viewed by the operator of the vehicle. The casing 50 has an inlet 53 leading thereinto in the direction of travel of the vehicle and terminating into a transverse air flow passageway 55. The air flow passageway 55 extends across the casing 50 and terminates in an outlet 56 extending parallel to the inlet 53 and opening in an opposite direction from the inlet.

A shaft or pivot pin 57 extends across the passageway 55 and is suitably journalled therein and forms a pivotal mounting for the vane 48, adjacent the upper end of said vane. A gear 58 is shown as being mounted on the inner end of the pivot shaft 57. The gear 58 meshes with an intermediate gear 59, which in turn meshes with a gear 60 on a pivot shaft 61, suitably journalled in the casing 50, and forming a mounting shaft for the needle 45. As shown in FIGURE 5 the gear train of the meshing gears 58, 59 and 60 is a step up gear train to effect movement of the needle 45 proportionate to the flow of air along the air flow pasageway 55 and angular movement of the vane 48. The particular ratio herein shown is a 3:1 ratio, that is, the shaft 61 rotates at three times the speed of rotation of the shaft 57. This has been found to give an accurate travel of the needle 45 along the window 47 to designate the correct ground speed of the vehicle in accordance with the air flow through the passageway 55 and travel of the vane 48. It is, of course, understood that where the vane 48 may travel a greater distance than the speed indicating area of the window 47, that a step down reduction may be provided. When the angular movement of the vane from zero speed indicia number to a maximum speed indicia number on the scale 47, is the same as the distance from the zero speed indicia to the maximum speed indicia number, a 1:1 gear train may be provided.

Since the air pressure resulting from the travel of the vehicle is a direct function of automobile speed, as the vehicle is traveling in the pressure of air on the vane 48 will move said vane and the needle 45 in accordance with the speed of travel of the vehicle to provide an accurate indication of the vehicle speed. As, however, the vehicle slows down, the weight of the vane 48 acting against the reduced air flow through the passageway 45 will accommodate the vane to move downwardly and pivot the needle 45 toward its low speed indicating position.

While I have herein shown and described one form in which the invention may be embodied, it may readily be understood that various variations and modifications in the invention may be attained without departing from the spirit and scope of the novel concepts thereof.

I claim as my invention:

1. In an air actuated ground speed indicator, a casing adapted to be mounted on the exterior of a vehicle in view of the operator of the vehicle and having, an air passageway leading therethrough in the direction of travel of the vehicle and opening to the atmosphere at the leading end of the casing and discharging to the atmosphere at the trailing end of the casing, a window in said casing above said air passageway and facing the operator of the vehicle and having air speed graduations thereon, a drum pivot shaft pivotally mounted in said casing above said passageway for movement about a horizontal axis extending transversely of said passageway, a drum segment having spokes extending radially inwardly therefrom and mounted on said drum pivot shaft, a vane in said passageway, a vane pivot shaft pivotally mounted in said passageway for movement about an axis extending transversely thereof and disposed adjacent the upper end of said passageway and suspending said vane from said pivot shaft, a drive arm on said vane pivot shaft and angularly moved thereby, a crank arm on said drum pivot shaft, a link connecting said drive arm to said crank arm and effecting movement of said drum upwardly along said window by the pressure of air on said vane and pivotally moving said vane in accordance with variations in speed, a counterweight mounted on and extending from said drum pivot shaft, to counterweight rotatable movement of said drum segment, a dash pot mounted in said casing and including, a cylinder having a piston therein and movable therealong, a piston rod extending from said piston and pivotally connected with said drive arm, said cylinder having a head end having a relatively large diameter air passageway leading therethrough, a check valve pivoted to said head end and closing said passageway upon movement of said piston away from said head end, said check valve having at least one bleeder hole therein controlling movement of said piston away from said head end, said check valve opening upon movement of said piston toward said head end to accommodate free travel of said drum in a decreasing speed indicating direction.

2. An air actuated ground speed indicator particularly adapted for indicating the ground speed of a vehicle comprising, a casing having an air passageway leading therethrough and opening in the direction of travel of the vehicle, a window in said casing spaced from said air passageway and adapted to be in the line of sight of the operator operating the vehicle, an air speed indicator pivotally mounted in said casing and visible through said window, a vane in said air passageway, means mounting said vane in said passageway adjacent the upper end thereof and accommodating said vane to depend across said passageway by gravity, a linkage and leverage connection from said vane to said ground speed indicator, moving said indicator in accordance with the air flow velocity through said passageway, a dash pot mounted in said casing and including,
  a cylinder having a piston therein,
  a piston rod extending from said piston and connected with said linkage and leverage connection to damp movement of said air speed indicator in a speed increasing indicating direction,
  said cylinder having a head end having a relatively large diameter air passageway leading therethrough,
  a check valve pivoted to said head end for closing said passageway upon movement of said piston away from said head end,
  said check valve having at least one bleeder hole therein controlling movement of said piston away from said head end, whereby said check valve opens upon movement of said piston toward said head end to accommodate free travel of said drum in a decreasing speed indicating direction.

3. An air actuated ground speed indicator in accordance with claim 2,
  wherein said linkage and leverage connection includes a counterweight bringing the speed indicator to its low speed position and counterbalancing any off-center weights on said speed indicator.

4. An air actuated ground speed indicator in accordance with claim 2,
  wherein a pedestal forms a mounting for the casing, and wherein the pedestal is made from a magnetic material.

References Cited by the Examiner

UNITED STATES PATENTS

| 1,626,216 | 4/1927 | Stratton | 73—228 |
| 2,178,422 | 10/1939 | Heagney | 73—186 X |
| 2,274,029 | 2/1942 | Archer | 73—228 |
| 2,359,592 | 10/1944 | Stokoe | 73—228 |
| 2,559,402 | 7/1951 | Comstock | 73—228 |
| 2,793,528 | 5/1957 | Cramer | 73—186 |

FOREIGN PATENTS

| 8,320 | 1910 | Great Britain. |

LOUIS R. PRINCE, *Primary Examiner.*